United States Patent
Mordini et al.

[11] Patent Number: 5,927,179
[45] Date of Patent: Jul. 27, 1999

[54] APPARATUS FOR QUICK BREWING OF TEA

[75] Inventors: Mauro Dominick Mordini, Parsippany, N.J.; Joseph Vaitkus, Greenvale; Adrian Ioan Ponici, Ridgewood, both of N.Y.

[73] Assignee: Lipton, Division of Conopco, Inc., Englewood Cliffs, N.J.

[21] Appl. No.: 08/974,912

[22] Filed: Nov. 20, 1997

Related U.S. Application Data

[60] Provisional application No. 60/056,030, Sep. 2, 1997.

[51] Int. Cl.$^6$ ..................................................... A47J 31/02
[52] U.S. Cl. ............................... 99/304; 99/306; 99/307; 99/317; 99/323
[58] Field of Search ............................... 99/304, 307, 306, 99/323, 317; 270/474, 477, 484

[56] References Cited

U.S. PATENT DOCUMENTS

| | | | |
|---|---|---|---|
| 102,139 | 4/1870 | Martin | 99/317 X |
| 1,990,508 | 2/1935 | Wilcox | 99/306 X |
| 3,045,827 | 7/1962 | Hough | 99/307 X |
| 4,527,467 | 7/1985 | Siemensma | 99/279 |

FOREIGN PATENT DOCUMENTS 7807403  7/1978  Netherlands.

Primary Examiner—Reginald L. Alexander
Attorney, Agent, or Firm—Milton L. Honig

[57] ABSTRACT

A brewing apparatus is provided including a housing with a water inlet channel, a heater to heat water delivered through the channel and a water dispenser within the housing for providing a spray of hot water to a brewing pot. The brewing pot is releasably attachable to the housing and includes a filter receptacle positioned to receive the spray of water and outlet aperture for allowing brewed tea to exit. A filter basket for containing the tea leaves is lodged within the filter receptacle. The basket has a base with a wire mesh screen and an integrally formed non-porous siphon shroud projecting upwardly from a central area of the floor base, the shroud being closed at the top while open at the bottom. A siphoning tube is lodged within the aperture of the filter receptacle and open at both ends. When nested, the siphon shroud surrounds the siphoning tube to create a siphon arrangement for continuously removing tea extract fluid from the filter basket. In an alternate preferred embodiment, the apparatus includes a fluted paper filter with a centered aperture fitting over the siphon shroud for nesting within the filter basket. Tea leaves are placed within the paper filter instead of directly within the basket.

27 Claims, 7 Drawing Sheets

APPARATUS FOR QUICK BREWING OF TEA

This application claims the benefit of U.S. Provisional Application No. 60/056,030, filed Sep. 2, 1997.

BACKGROUND OF THE INVENTION

1. Field of the Invention

The invention relates to an apparatus and brew element for rapidly brewing tea.

2. The Related Art

Tea is much more sensitive to brewing than coffee. Extended steeping in water often ruins the beverage. Too short steeping times result in too dilute a drink. Optimum steeping time is between 3 and 5 minutes.

Netherlands patent application 7807403 discloses a filter device for making tea comprising a filter vessel with siphoning mechanism for discharge of the tea brewed in the vessel. The siphoning means includes an outlet pipe which extends upward from the bottom of the filter vessel and a sleeve which surrounds the pipe. A passage for liquid is formed between the pipe and sleeve. An upper end of the sleeve is closed while a lower portion is formed with inlet apertures. The negative feature of this device is that the siphoning ceases at the instant the falling level of liquid in the filter vessel reaches the inlet apertures. Thereupon an air bubble is normally drawn into the siphoning means through the apertures. When water is next supplied to the filter vessel, the siphoning will not begin again until the liquid level reaches the upper edge of the outlet pipe.

An improvement of this basic concept is found in U.S. Pat. No. 4,527,467 (Siemensma). Tea leaves are placed in a bowl having an outlet aperture formed in its bottom for discharge of brewed tea. An outlet tube communicates with the outlet aperture and extends upwardly from the bottom of the bowl. A sleeve surrounds the outlet tube with a space between them providing an annular siphon passageway. The upper end of the sleeve is closed while the lower end rests on the bowl bottom. Capillary inlet apertures are formed in the lower portion of the sleeve. As the liquid level falls in the bowl, the static pressure of the liquid retained in the annular siphon passageway is balanced by the capillary pressure of the retained liquid in the capillary inlet apertures. Passage of airway bubbles through the capillary inlet apertures is thereby prevented. Upon addition of further liquid to the bowl, the siphoning operation immediately resumes.

While the siphon arrangement in U.S. Pat. No. 4,527,467 significantly advances the art, the device is still subject to certain problems. Tea placed within the bowl for brewing can migrate to the capillaries. Particles of tea can then occlude the capillary inlet apertures interfering with siphoning. Sometimes relatively small particles can be swept through the capillary inlets with eventual siphoning into the consumer's brew. Of course, these particles in the brewed product are aesthetically and taste-wise undesirable.

Accordingly, it is an object of the present invention to provide a brewing apparatus allowing for tea to steep in its optimal range of from 3 to 5 minutes.

Another object of the present invention is to provide a brewing apparatus whose function is unimpaired by tea particle interference in the brewing mechanisms.

Yet another object of the present invention is to provide a brewing apparatus for loose (bag-less) brewing to achieve zestiness and body unachievable through extraction of bagged tea.

Still another object of the present invention is to provide a brewing apparatus based on a user friendly system no longer requiring laborious cleaning of tea particles from a basket between subsequent brew batches.

A still further object of the present invention is to provide a brewing apparatus which can deliver not only hot but iced tea directly from a brewed batch.

These and other objects of the present invention will become apparent from the following summary, drawings and detailed description.

SUMMARY OF THE INVENTION

A brewing apparatus is provided which includes:

a housing;

a water inlet channel within the housing;

a heater within the housing to heat water delivered through the inlet channel;

a water dispenser within the housing communicating with and dispensing water from the inlet channel;

a filter receptacle positioned to receive water from the water dispenser and having an outlet aperture;

a filter basket removably nested within the filter receptacle for containing tea leaves, the basket including a base with an at least partially porous floor and a non-porous siphon shroud formed in the base projecting orthogonally upwards from a central area of the floor; and a siphoning tube open at both ends, communicating with the aperture of the filter receptacle.

The at least partially porous floor is preferably a wire mesh screen or a plastic bottom with a multiplicity (greater than four, preferably greater than twenty and optimally greater than one hundred) holes. Further, the floor when it is a wire mesh screen may be constructed with a plurality of supporting arms equidistant from one another. These radiate outwardly from the siphon shroud.

The filter basket in cross-sectional diameter is preferably at least four times the diameter of the siphon shroud.

The filter receptacle includes a bottom wall and a surrounding wall projecting upwards from the bottom wall and encompassing same. The surrounding wall has inner and outer surfaces. The inner surfaces include inwardly projecting steps functioning to stably position the filter basket within the filter receptacle. Outer surfaces of the receptacle taper downwardly in steps toward the bottom wall.

A series of baffles form channels for directing extracted tea liquids to a passageway between the siphon shroud and siphoning tube. The baffles are radially oriented toward the siphoning tube. Baffles of shorter length separate baffles of longer length. These baffles number from 6 to 30, preferably from 8 to 16.

The water dispenser includes several orifices opening outside the housing. They are positioned above the filter receptacle for spraying water into the filter basket. The shower action of the spray efficiently extracts the tea. This contrasts with the bath system where all the volume of water is simultaneously added to the filter basket. Loss of tea flavors is also minimized with the shower system.

Orifice openings of the water dispenser are preferentially arranged in a circular pattern. These orifices may number from 6 to 24, preferably from 8 to 16 openings.

Advantageously, the filter basket may be provided with a paper filter, preferably a fluted paper filter. An aperture centered in a floor of the paper filter allows the filter to fit over the siphon shroud and be snuggly held within the filter basket. Tea leaves are loaded within the paper filter where they are loose brewed. Without mess the apparatus can be reset for a further brew cycle simply by removing the paper filter containing spent leaves. A preferred size for the paper filter includes the dimensions of approximately: a 5 inch base, a 4.25 inch wall height and a 0.625 inch center hole. In its fluted arrangement, the open mouth of the filter will have an approximate 7.5 inch diameter. When flattened, the paper filter has approximately a 12 inch diameter. Other dimensions may also be suitable and are dependent upon dimensions of the filter basket and siphon shroud.

Paper filters of the present invention can be manufactured by cutting a donut shaped section from a flat piece of filter paper stock. Subsequent to cutting, a forming die is applied to the cut section and steam applied for approximately five seconds. Through the combined pressure of die and steam a three-dimensional fluted paper results.

DETAILED DESCRIPTION OF THE DRAWINGS

The above features, advantages and objects of the present invention will more fully be appreciated through the following discussion, reference being made to the drawing in which.

DETAILED DESCRIPTION

Figure 1:
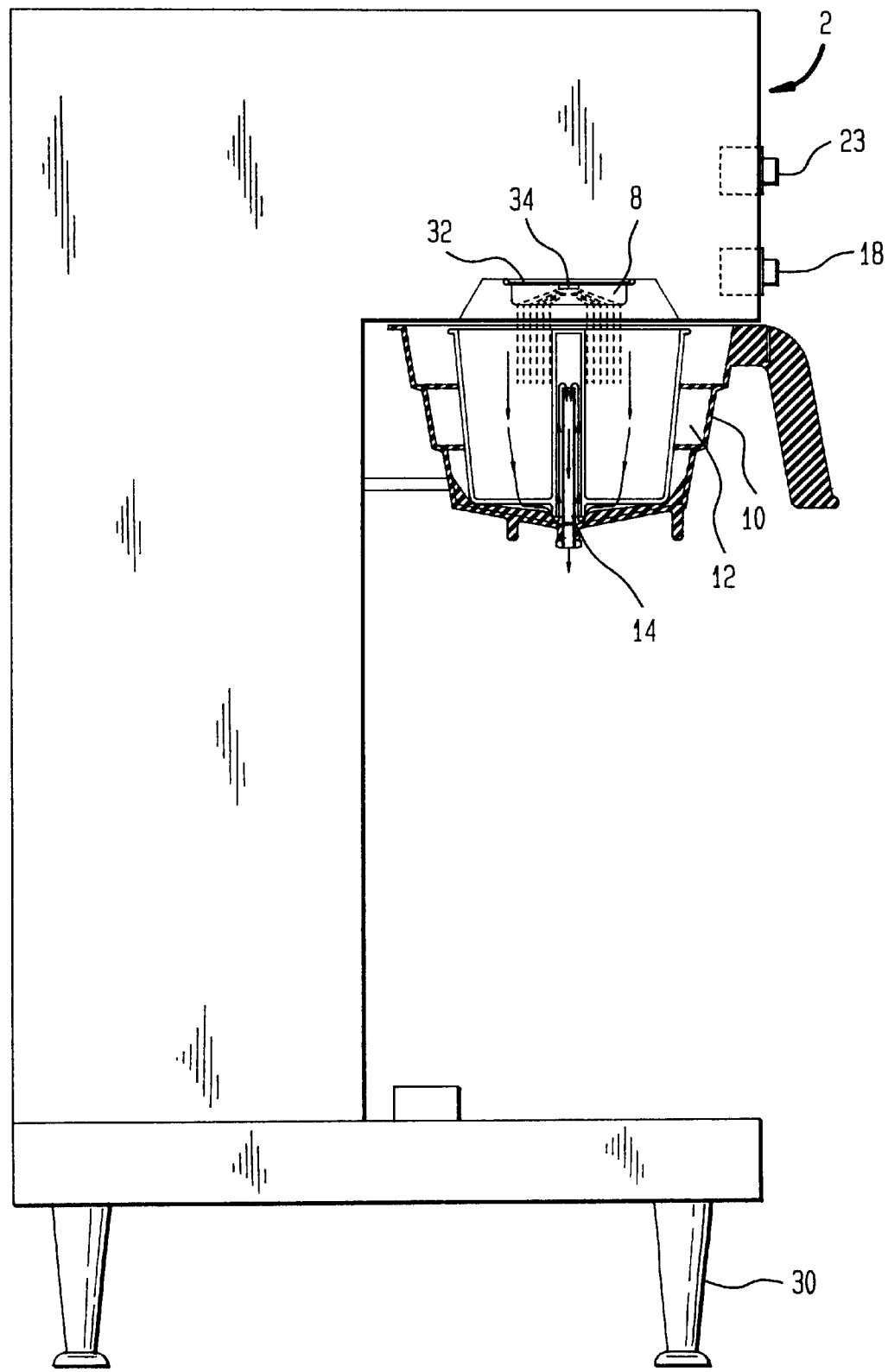
FIG. 1 is a side view of the brewing apparatus.
Figure 2:
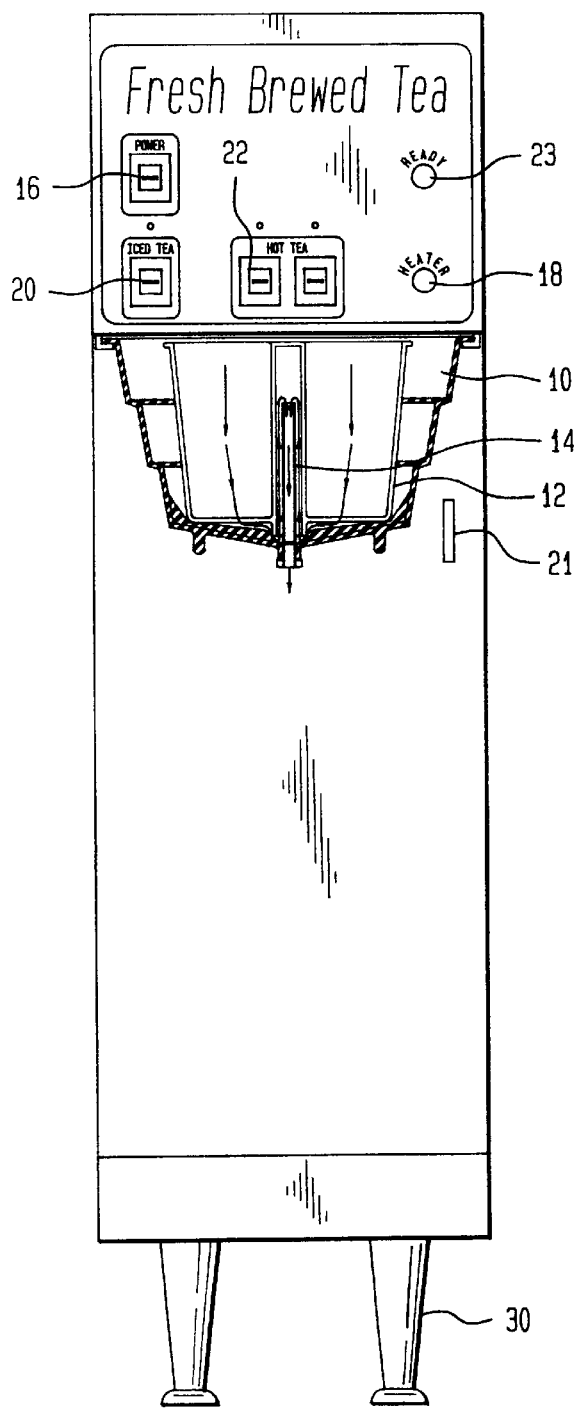
FIG. 2 is a front view of the brewing apparatus.
Figure 3:
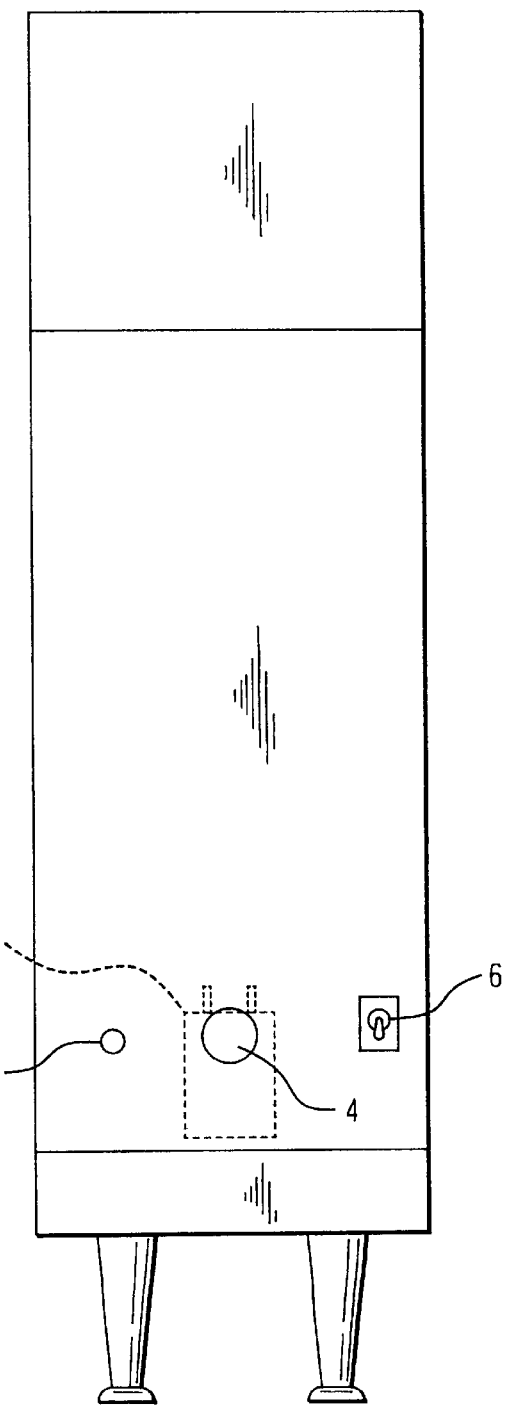
FIG. 3 is a rear view of the brewing apparatus.

The brewing apparatus of the present invention is illustrated in FIGS. 1 through 3. The apparatus consists of a housing 2 with a water inlet channel 4, a heater 6 to heat the water, a water dispenser 8, a filter receptacle 10, a filter basket 12 within the receptacle, and a siphoning tube 14.

A series of functional controls can be regulated through activating buttons along the front of the apparatus. Electrical power is initiated through a power switch 16. Activation of heater 6 is confirmed through a heater light 18. Hot or iced tea routes are selected by pressing a respective iced tea brew button 20 or hot tea brew button 22. Cold water can be added through spigot 21. When the heater has reached an appropriate temperature, the ready light 23 becomes activated. As shown in FIG. 3, the apparatus along the back housing includes a power cord 24, a machine heater switch 26 and a dual water inlet solenoid valve 28. The housing is supported by a system of legs 30.

Figure 4:
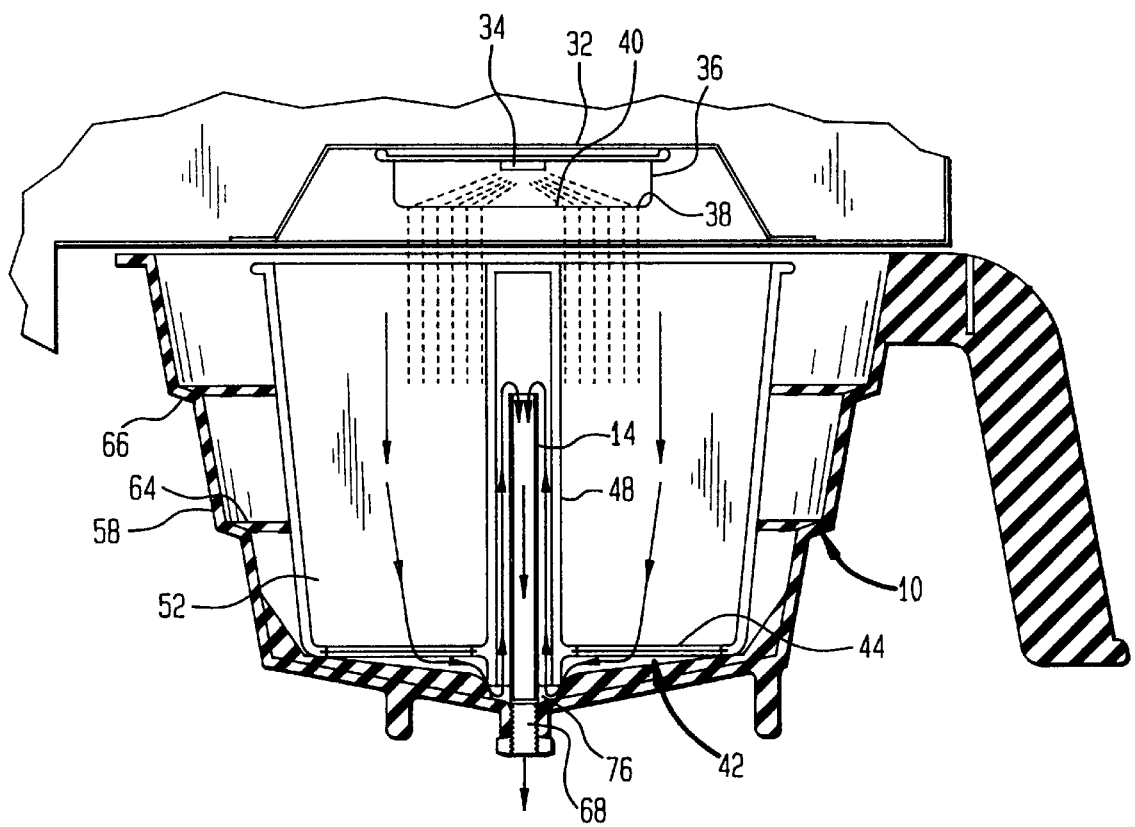
FIG. 4 is a cross-sectional view of the filter receptacle and basket positioned below the water dispenser, the housing being only partially shown.
Figure 9:
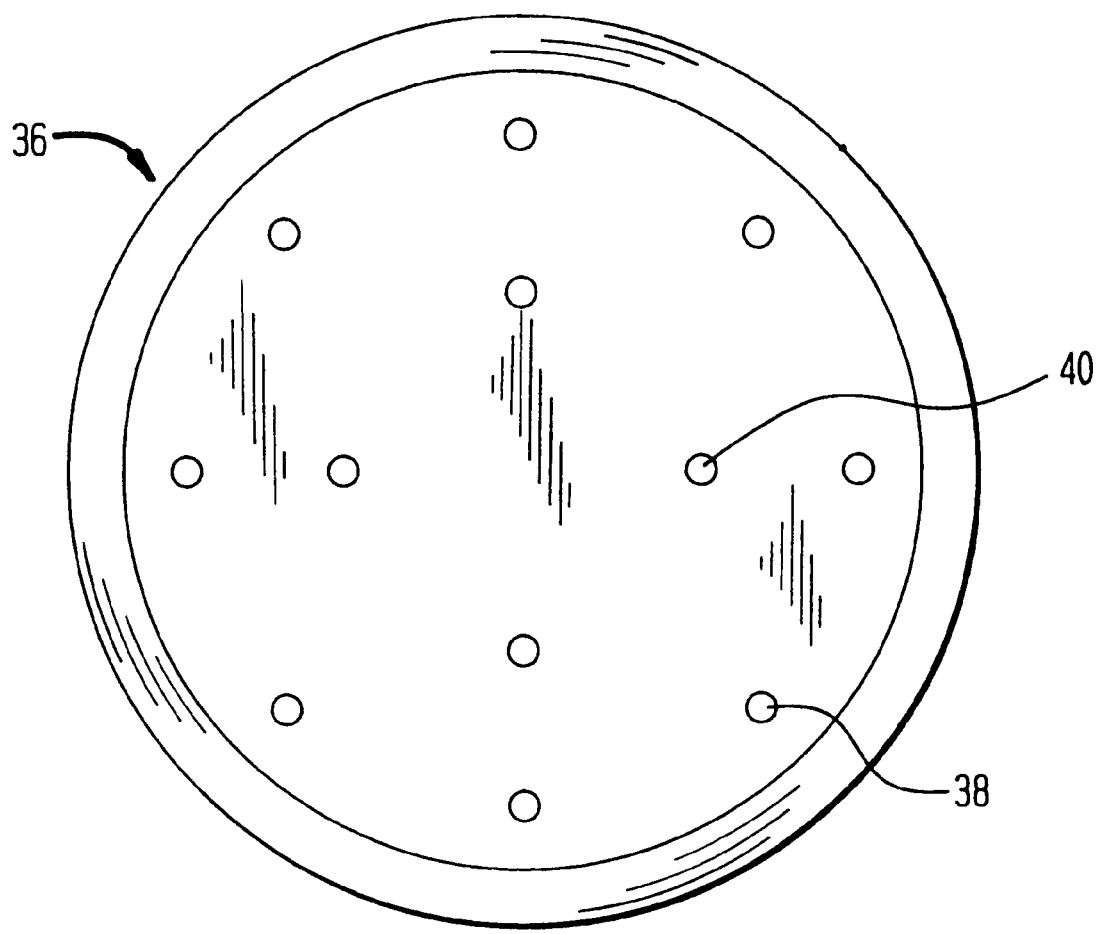
FIG. 9 is a bottom view of the water dispenser from which water is sprayed into the filter basket.

FIG. 4 provides an enlarged cross-sectional view of the brewing pot which includes filter receptacle and filter basket. The filter receptacle 10 is positioned to receive water from a water dispensing outlet 32 having an outlet aperture 34. A plate 36 forming part of the water dispensing outlet is formed with a series of orifices 38 opening toward an outside of the housing. These orifices are positioned above the filter receptacle to provide a spray of water into the filter basket. The orifices are arranged in a circular pattern along a circumference of plate 36 with their total number being 8 as shown in FIG. 9. Concentrically within the outer circle of orifices are a further grouping of four inner orifices 40.

Figure 5:
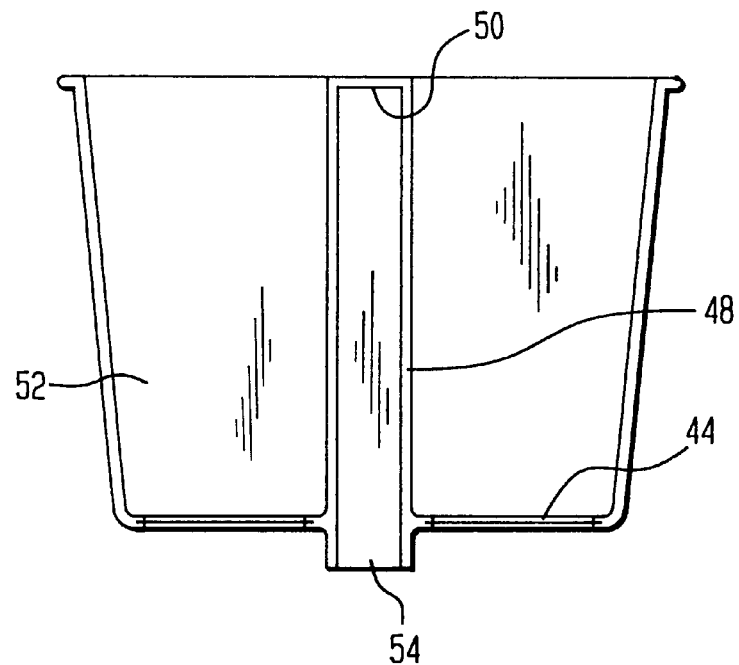
FIG. 5 is a cross-sectional view of the filter basket.
Figure 6:
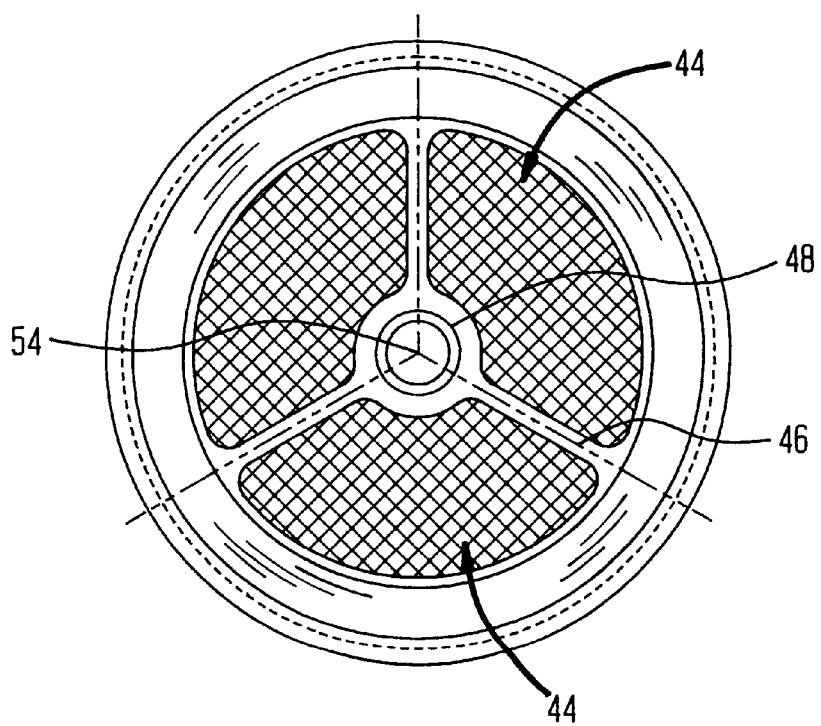
FIG. 6 is a bottom view of FIG. 5.

Filter basket 12 includes a porous floor 42 mainly formed as a wire mesh screen 44. FIG. 6 illustrates the mesh screen being braced with three supporting arms 46 equidistant from one another and radiating outwardly from a siphon shroud 48. In a preferred second embodiment, the mesh screen is replaced by a plastic floor punctured with a series of holes 49 to allow passage of tea extract. As shown in FIG. 5, the siphon shroud 48 is integrally formed as a part of the base of the filter basket. An upper end of the siphon shroud is closed having no access to a tea leaf receiving area 52 of the basket. Opposite the closed end 50 is an open end 54.

Figure 7:
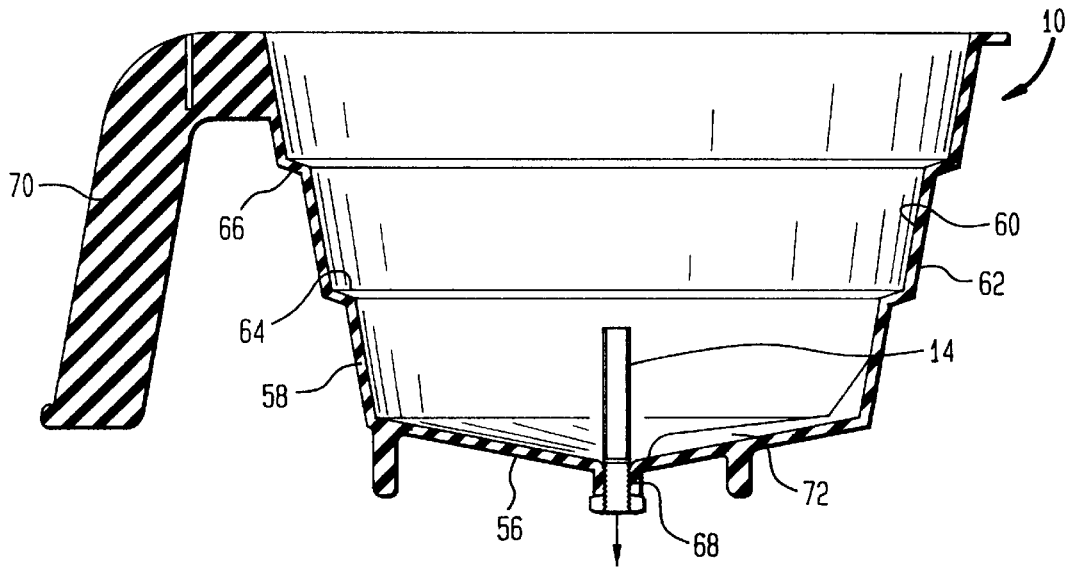
FIG. 7 is a cross-sectional view of the filter receptacle without the basket.

FIG. 7 illustrates the filter receptacle 10 within which the filter basket 12 can be received. The receptacle includes a bottom wall 56 and a surrounding wall 58 projecting upwards from the bottom wall and encompassing it. Inner and outer surfaces 60, 62 define the surrounding wall 58. The inner surface includes inwardly projecting steps 64 functioning to stably position the filter basket within the filter receptacle. Outer surface 62 tapers downwardly in steps 66 toward the bottom wall of the filter receptacle. Siphoning tube 14 is open at both ends, with one end being lodged within an aperture 68 of the filter receptacle. Handle 70 is sufficiently insulated to allow a user to grab and move the brewing pot.

Figure 8:
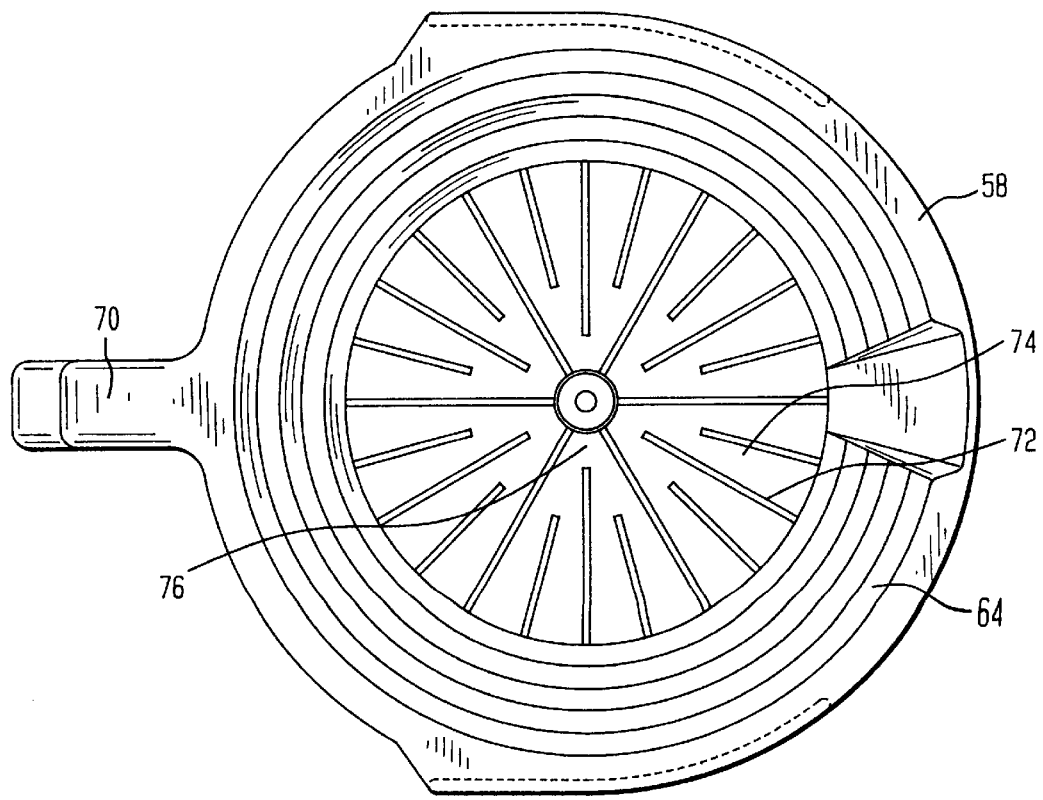
FIG. 8 is a top plan view of the filter receptacle of FIG. 7.

FIG. 8 illustrates a series of baffles 72 forming channels 74 which direct extracted tea fluids into a passageway 76 between the siphon shroud and siphoning tube. The baffles are radially oriented toward the siphoning tube. Some of the baffles are of shorter length while alternating other baffles are longer with the arrangement ensuring that the resultant channels will merge toward the passageway.

Figure 10:
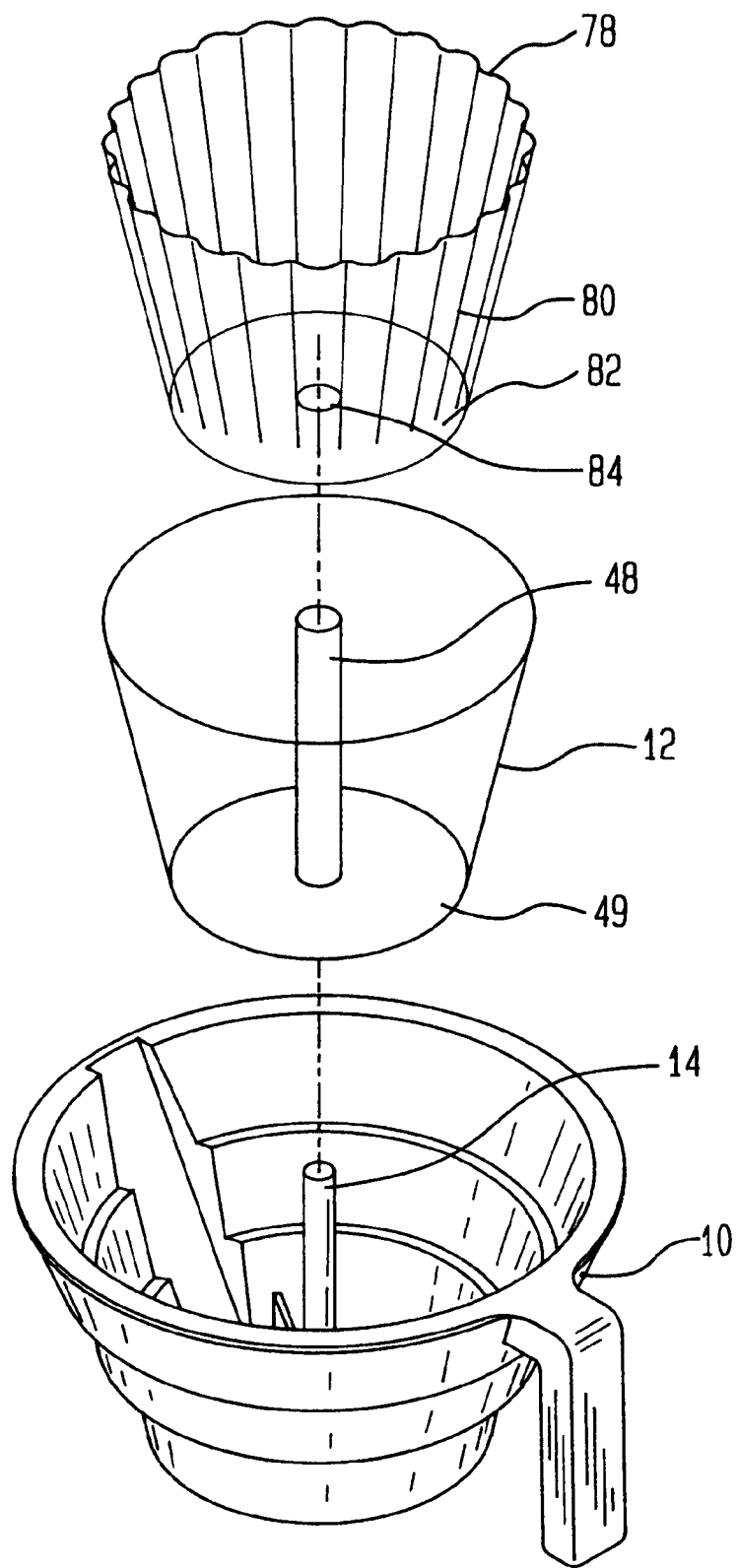
FIG. 10 is an exploded perspective view of filter paper, filter basket and filter receptacle nesting one within another.

FIG. 10 illustrates a further refinement of the present invention. For purposes of ease in cleaning the apparatus between different batches of tea, a paper filter 78 serves as a bowl receiving the tea to be extracted. Filter 78 is defined by fluted walls 80 tapering outwardly and a filter floor 82 with a center aperture 84. The diameter of center aperture 84 is larger than that of the siphon shroud 48 so that it can fit around the shroud and thereby seat the paper filter within basket 12. Additionally there can be provided a mechanism such as a twist lock system on the basket and/or receptacle to secure the paper filter against rotational movement.

In operation, the filter basket is provided with tea leaves and inserted within the filter receptacle so that the siphon shroud fits over the siphoning tube. More preferably, the paper filter is first inserted within the filter basket and then the tea leaves are charged to the paper filter. Hot water is then sprayed over the tea leaves. Water with the tea extract then flows through the wire mesh screen or plastic hole perforated floor of the filter basket exiting same and following the channels of the filter receptacle towards the passageway in the base of the receptacle. Through siphoning action, the tea extract liquid is lifted upwards between walls of the siphon shroud and siphoning tube eventually flowing upwards and then down the siphoning tube to exit the receptacle in a continuous and rapid manner.

When iced tea is desired, the hot steeped tea extract is fed into a receiving vessel held below the outlet aperature of the filter receptacle. Cold water is then delivered through a cold water spigot into the vessel. Most preferred is a ratio of hot steeped tea extract to cold water of 1:3, but may range from 3:1 to 1:10.

The foregoing description illustrates selected embodiments of the present invention and in light thereof variations and modifications will be suggested to one skilled in the art, all of which are within the spirit and purview of this invention.

What is claimed is:

1. A brewing apparatus comprising:

a housing;

a water inlet channel within the housing;

a heater within the housing to heat water delivered through the inlet channel;

a water dispenser within the housing communicating with and dispensing water from the inlet channel;

a filter receptacle positioned to receive water from the water dispenser and having an outlet aperture;

a filter basket removably nested within the filter receptacle for containing tea leaves, the basket including a base with an at least partially porous floor and a non-porous siphon shroud formed in the base projecting orthogonally upwards from a central area of the floor; and a siphoning tube open at both ends, communicating with the aperture of the filter receptacle, whereby a passageway is formed between the siphoning tube and the shroud.

2. The apparatus according to claim 1 wherein the at least partially porous floor comprises a wire mesh screen.

3. The apparatus according to claim 2 wherein the floor further comprises a plurality of supporting arms equidistant from one another radiating outwardly from the siphon shroud.

4. The apparatus according to claim 1 wherein the filter basket in cross-sectional diameter is at least four times greater in size than that of the siphon shroud.

5. The apparatus according to claim 1 wherein the filter receptacle comprises a bottom wall and a surrounding wall projecting upwards from the bottom wall and encompassing same.

6. The apparatus according to claim 5 wherein the surrounding wall comprises inner and outer surfaces, the inner surfaces including inwardly projecting steps functioning to stably position the filter basket within the filter receptacle.

7. The apparatus according to claim 6 wherein the outer surfaces taper downwardly in steps towards the bottom wall of the filter receptacle.

8. The apparatus according to claim 5 further comprising a plurality of baffles forming channels for directing extracted tea fluids into a passageway between the siphon shroud and siphoning tube.

9. The apparatus according to claim 8 wherein the baffles are radially oriented toward the siphoning tube.

10. The apparatus according to claim 9 wherein some of the plurality of baffles are shorter in length than other baffles, the shorter baffles alternating with the longer baffles.

11. The apparatus according to claim 9 wherein the baffles number from 6 to 30.

12. The apparatus according to claim 9 wherein the baffles number from 8 to 16.

13. The apparatus according to claim 1 wherein the water dispenser has a plurality of orifices opening outside the housing and positioned above the filter receptacle for spraying water into the filter basket.

14. The apparatus according to claim 13 wherein the orifices are arranged in a circular pattern.

15. The apparatus according to claim 13 wherein the orifices number from 6 to 24.

16. The apparatus according to claim 13 wherein the orifices number from 8 to 16.

17. The apparatus according to claim 1 wherein the siphoning tube is of a sufficient diameter to ensure that tea leaves within the filter receptacle are steeped with water for a period ranging from 3 to 5 minutes.

18. The apparatus according to claim 1 further comprising a paper filter formed of vertical walls rising from a floor.

19. The apparatus according to claim 18 wherein the filter walls are fluted.

20. The apparatus according to claim 18 wherein the floor further comprises an aperature in a center thereof having a diameter larger than a diameter of the siphon shroud.

21. A brewing pot comprising:

a filter receptacle having a bottom wall and a surrounding wall projecting upwards from the bottom wall and encompassing same, and having an outlet aperture in the bottom wall;

a filter basket movably nested within the filter receptacle for containing tea leaves, the basket comprising a base with an at least porous floor and a non-porous siphon shroud formed in the base projecting orthogonally upwards from a central area of the floor; and a siphoning tube open at both ends, communicating with the aperture of the filter receptacle, whereby a passageway is formed between the siphoning tube and the shroud.

22. The brewing pot according to claim 21 wherein the at least partially porous floor comprises a wire mesh screen.

23. The brewing pot according to claim 21 wherein the floor further comprises a plurality of supporting arms equidistant from one another radiating outwardly from the siphon shroud.

24. The brewing pot according to claim 21 wherein the filter basket in cross-sectional diameter is at least four times greater in size than that of the siphon shroud.

25. The brewing pot according to claim 21 wherein the surrounding wall comprises inner and outer surfaces, the inner surfaces including inwardly projecting steps functioning to stably position the filter basket within the filter receptacle.

26. The brewing pot according to claim 21 further comprising a plurality of baffles forming channels for directing extracted tea fluids into a passageway between the siphon shroud and siphoning tube.

27. The brewing pot according to claim 21 wherein the siphoning tube is of a sufficient diameter to ensure that tea leaves within the filter receptacle are steeped with water for a period ranging from 3 to 5 minutes.

* * * * *